United States Patent Office 3,342,577
Patented Sept. 19, 1967

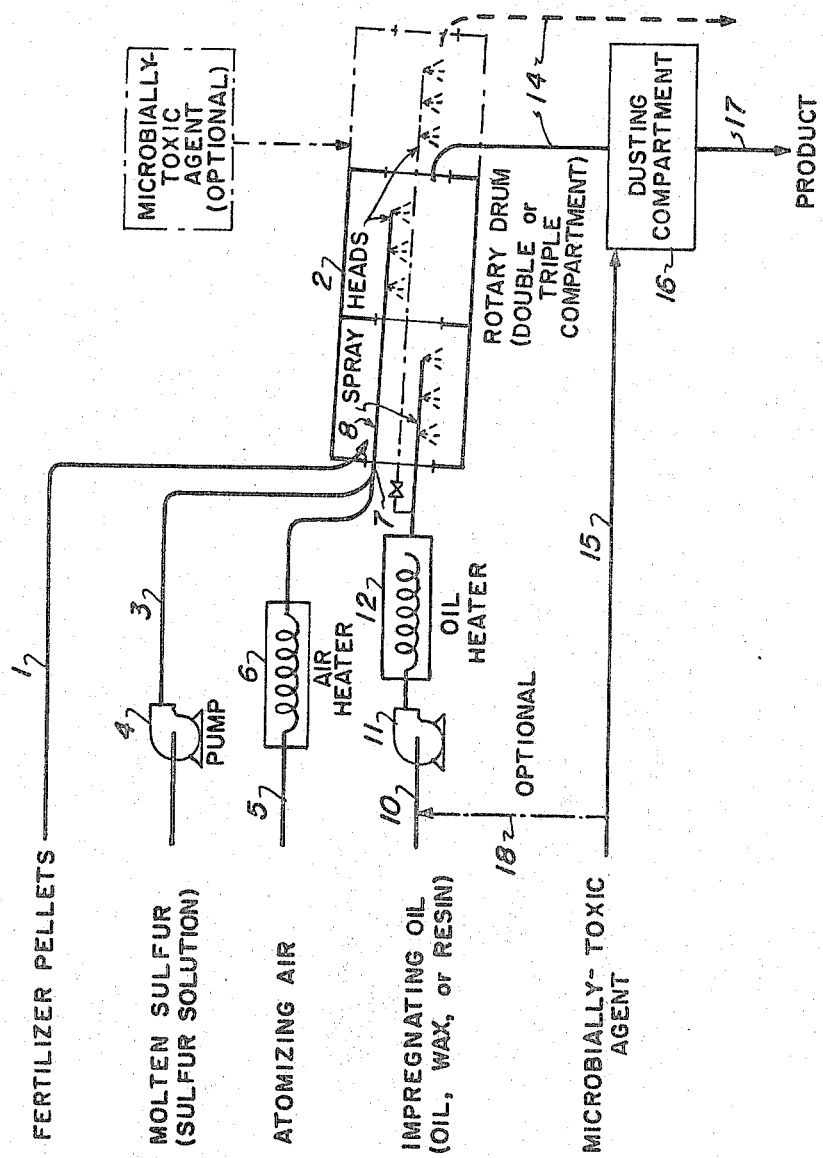

3,342,577
SULFUR-COATED FERTILIZER PELLET HAVING CONTROLLED DISSOLUTION RATE AND INHIBITED AGAINST MICROBIAL DECOMPOSITION
Glenn M. Blouin, Florence, and Donald W. Rindt, Sheffield, Ala., assignors to Tennessee Valley Authority, a corporation of the United States
Filed Dec. 12, 1966, Ser. No. 601,178
4 Claims. (Cl. 71—3)

ABSTRACT OF THE DISCLOSURE

The application describes and claims a significant improvement of the sulfur-coating process claimed in the parent application (use of a nearly impervious, multi-layered shell of elemental sulfur and a small amount of oily or waxy sealant material to control and delay dissolution of soluble fertilizers so coated in the soil solution), particularly when the coated fertilizer is mixed into the soil. The drastic improvement is achieved by retarding the degradating action of soil microorganisms such as bacteria, fungi, or both, on the composite coating by the addition of small amounts (0.1 to 10 percent, preferably 0.1 to 4 percent) of microbially toxic agents to the coated pellet. This may be done by dusting the powdered microbially-toxic agent onto the sealant topcoating where it adheres. In the case of liquid microbially-toxic agents miscible with the sealant or in the case of solid microbially-toxic agents soluble in the molten sealant, the agents may be incorporated in the sealant prior to its addition to the coated pellet. The microbially-toxic agents which have proved to be effective in greatly improving the characteristics of sulfur coated fertilizers in the soil are: pentachlorophenol, sodium pentachlorophenate, coal tar oil, cresol, calcium cyanamide, ethylene polysulfide, cupric chloride, borax, boric acid, sodium azide, potassium azide, streptomycin, and camphor. Many other common antiseptics and antibiotics also probably would be effective.

This application is a continuation-in-part of our application Ser. No. 542,947, filed May 3, 1965 and now Patent No. 3,295,950; which application, in turn, is a continuation-in-part of our application Ser. No. 292,215, filed June 28, 1963, and now abandoned.

The invention herein described may be manufactured and used by or for the Government for governmental purposes without the payment to us of any royalty therefor.

Our invention relates to an improved method to delay and control dissolution of soluble fertilizer materials when said materials are applied to the soil, and more particularly to a method for coating soluble fertilizer pellets so as to control the rate of dissolution in the soil as well as the products obtained by such method of treatment.

The earlier work described and claimed in our parent applications was principally concerned with the use of medium grade (viscosity) petroleum oils as a subcoating and/or topcoating for elemental sulfur coatings on fertilizer particles. This represented the best practice with which we were familiar at that time. We have, in the ensuing time, found that two petroleum byproducts, namely, petrolatums (crude and refined) and softwaxes, are even more effective than the petroleum oils. The present invention is directed toward specifically claiming these materials as sealant sub- and/or topcoatings. Also involved is a revision of the molten sulfur temperature range; 120° to 155° C. has now been determined to be the optimum sulfur temperature range.

Heretofore, the two principal approaches directed to controlling the rate of dissolution of soluble fertilizer salts and the like when applied to the soil have been either the production of a slowly soluble chemical compound, such as ureaform, or the method of coating fertilizer pellets with insoluble impervious shells. Such fertilizer materials having controlled rates of dissolution have numerous advantages over untreated water-soluble fertilizer compositions. Such treated fertilizer materials greatly reduce the leaching of the fertilizer by movement of the soil solution, minimize luxury consumption of the fertilizer by the plant, lower toxicity to seedlings or plants due to salt concentration, and decrease the loss of fertilizer values due to decomposition of same to the gaseous phase. On the other hand, when untreated water-soluble fertilizer materials are applied to the ground, much of their nutrient values may be carried away by the natural or artificial ground drainage and so wasted as far as useful contribution to the growth of the crop for which they are supplied. In fact, experiments have shown that as much as 80 percent of the fertilizer may be so wasted; therefore, smaller quantities of fertilizers having controlled dissolution rates can give the same effect as a larger quantity of hygroscopic, untreated fertilizer material, or the same quantity of fertilizer having a controlled dissolution rate can give a more prolonged effect throughout the growing season.

In the past, however, water-soluble fertilizer compositions treated for delayed dissolution or "waterproofing" had some outstanding disadvantages. Among these disadvantages is the fact that both types of commercial product, viz., the slowly soluble chemical compound and the waterproofed fertilizer salt pellets, have been found to be expensive and difficult to produce; and neither can be utilized in commercial farm crop applications because of the premium cost of the fertilizer. As used in this specification, the term "pellet" is used to include granules, prills, mixtures thereof, and other types of sized particles.

As heretofore carried out, the approach of coating fertilizer pellets with insoluble nearly impervious shells (hereinafter referred to as "waterproofing" for the sake of convenience) has generally been accomplished by applying the coating agent in a liquid condition to the individual particles of the hygroscopic fertilizer material. The results of such procedures, however, have not been found to be altogether satisfactory. Thus, it was frequently found in the case wherein the impervious shell comprised an oil or oil-like material that, if sufficient oil were employed to waterproof the material, the physical and chemical properties of the coated material were markedly and adversely affected. This is particularly noticeable in waterproofing water-soluble ingredients, such as urea and the like. Various other prior-art methods for bringing about a waterproofing effect for soluble fertilizer materials have included, for example, coating with lycopodium starch, other light powdery materials, and a waterproofing agent consisting of the metallic salts of high molecular weight fatty acids.

With reference to the above-mentioned approach of controlling rate of dissolution of fertilizer materials by means of producing slowly soluble chemical compounds, a recent development along these lines is disclosed in U.S. Patent 3,024,098, Strand et al. Strand teaches that his fertilizer product is characterized by containing sufficient amounts of nutrients in a concentration nontoxic to plants so as to release them slowly and gradually in the soil and make them available during at least the first full growing season of the plant. In accordance with his teachings, he produces a unitary fertilizer product by preparing a finely divided mass comprising essentially at least one nutrient constituent selected from the group consisting of certain types of urea formaldehyde compounds and phosphorus containing compounds. The mass is then compressed in a suitable apparatus into unitary products of predetermined substantially uniform size corresponding to the weight in the range from about 1 to 30 grams with a resulting fertilizer product containing sufficient amounts of nutrient in a highly concentrated but slowly soluble form.

Our invention is directed to an improved process for controlling and delaying dissolution of soluble fertilizers in the soil by means of coating such fertilizers with a nearly impervious shell, said shell comprising an inexpensive fertilizer raw material, elemental sulfur, along with a small amount of an inexpensive material selected from the group consisting of petrolatums, petroleum softwaxes, petroleum oils, wood rosins, paraffins, and mixtures thereof. These materials are collectively or individually referred to as sealants hereafter. They are most conveniently applied in the fluid state, being melted if necessary. We have overcome the disadvantages inherent in the methods of coating or waterproofing hygroscopic fertilizer materials of the type shown in the prior art to a substantial extent in the present invention by means of our two-step or three-step coating procedure wherein a substantial part of the resulting nearly impervious shell is utilized in the dual role of supplying a secondary plant nutrient to the soil and acting as a controlling agent for the dissolution rate of the fertilizer particle substrate. The material comprising the shell in our invention costs less than one-tenth the cost of coating materials disclosed in the prior art.

Our process consists of a combination of two or three steps: first, the application of material selected from the group comprising petrolatums, petroleum softwaxes, petroleum oils, wood rosins, paraffins, and mixtures thereof, to the fertilizer pellets as an undercoating; second, the application of a sulfur coating to the treated pellets; and third, the application of an additional amount of the sealant material as a topcoating. In many cases, the first step may be omitted without serious effect. We have found that the petrolatum or other sealant, for example, may be applied by spraying or by soaking or dipping the pellets in the liquified sealant. If desirable, vacuum or pressure may be used in the soaking procedure to force more sealant into the void spaces of the individual pellets. In the second step, the sealant-treated pellets are coated with sulfur by spraying liquid molten sulfur or sulfur dissolved in liquid ammonia or other volatile solvent onto a rolling bed of pellets. In our process, the sulfur solidifies upon contact with the pellets and gradually builds a continuous shell around each pellet. We have found that it may be desirable to add small amounts (2 to 10 percent) of plasticizers, such as organic polysulfides, halides, or phosphorus polysulfides, to the molten sulfur to improve the quality of the resulting sulfur coating. In addition, small amounts (1 to 30 percent by weight of the mixture) of inert, finely divided solid materials such as powdered talc, and vermiculite or finely divided chemical compounds referred to as micronutrient compounds may be substituted for the above-mentioned plasticizers to realize even greater economies in our process. The micronutrient compounds are generally insoluble salts or frits of iron, zinc, copper, magnesium, manganese, molybdenum, boron, etc. Growing plants require these elements in very small quantities. The required quantities are so small that even distribution over the relative bulk of primary fertilizers presents a serious problem. Finely powdered micronutrients are necessary for this reason. However, this presents the problems of dusting off and segregation of micronutrients. Inclusion in the sulfur coating shell solves both problems, i.e., even distribution and adherence. The sulfur coating may either be relatively light and unsealed and therefore specifically used to contain the micronutrients (Example V infra) or it may be heavier and sealed to realize slow-release characteristics (Example VI infra). These solid materials may be coarse but at least —100 mesh is preferable for ease of suspension in the molten sulfur prior to application.

We have also found that the use of larger than normal pellets (e.g. —4 +6 mesh v. —8 +16 mesh) is also beneficial in improving the effectiveness of a given proportion of coating. This is due to the fact that the larger particles have a greater ratio of weight to surface area so that a greater film thickness is obtained for a given proportion of coating.

We have found also that, in most instances, the third step is equally useful in promoting a nearly impervious shell on the fertilizer particles. In such instances, after the pellets have been treated with the sealant and subsequently coated with sulfur, a light topcoating of one of the sealants may be applied to the particles, thereby effecting a still more water-resistant shell about the particle substrate. However, often equally effective coatings may be produced when the first or sub-sealant coating is omitted.

In addition to our discoveries disclosed and taught in our two previously filed applications, supra, we have now quite unexpectedly found that further treatment of our coated and sealed fertilizer pellet can significantly increase the nearly impervious characteristics thereof by as much as up to tenfold, particularly when our coated fertilizer pellet aggregate is buried beneath the surface of the soil and exposed to the chemical and biological reactions therein. We now have found that this greater effectiveness of the composite coating can be achieved by the addition of small amounts of microbially-toxic agents from the group consisting of pentachlorophenol, sodium pentachlorophenate, coal tar oil, cresol, copper (ic) chloride, borax, boric acid, sodium azide, potassium azide, ethylene polysulfide, streptomycin, calcium cyanamide, and camphor. As may be seen, the first 4 agents are phenolic compounds; the next 3 agents are heavy metal salts; the next 2 agents are hydrazoric acid salts; the next one is an organic polysulfide; the next one a mycin antibiotic; the next one a nitrilic compound; and the last one a camphoric derivative. The microbially toxic agents, hereinafter referred to for the sake of convenience as M–T agents, greatly reduce microbial degradation of the composite coating when soil temperature and moisture conditions are optmum for maximum microbiological activity. It is postulated that although the base sulfur coating is also attacked to a certain degree by soil bacteria, the primary attack of the microorganisms is against the hydrocarbon-base sealant because (1) the appreciable degree of attack on untreated coatings is more rapid than is normally associated with bacterial degradation of sulfur in soil systems, and (2) the sulfur is protected to a great extent from intimate contact with the soil environment by the sealant coating. The M–T agents, preferably in a finely ground solid state, may be dusted onto the topcoating of sealant in amounts of 0.1 to 10 percent by weight of the product where it adheres to the oily surface. The preferable range is 0.5 to 4 percent by weight. M–T agents which are soluble in the sealant material—for example, the pentachlorophenol—may be dissolved in the sealant material prior to its application to the sulfur coating. Generally, lesser quantities, 0.1 to 1 percent by weight of the product, are used in this application. Furthermore, several new and advantageous features over the conventional processes for preparing fertilizer pellets of controlled dissolution rates are realized by the present invention.

Among the advantageous features are: a simple and inexpensive improved process for waterproofing hygroscopic fertilizer pellets; a means for utilizing one of the cheapest fertilizer raw materials, elemental sulfur, in a dual role of supplying secondary plant-nutrient values to the soil, and contributing substantially the bulk of the material comprising the impervious shell.

It is therefore an object of the present invention to provide a process for the economical treatment of solid fertilizer substances of reduced particle size, such as granules, prills, and other types of sized particles, to make them resistant to dissolution in water, to reduce caking tendencies, to reduce or eliminate hygroscopicity, to retard the degrading action of soil microorganisms, and to produce a fertilizer product having a controlled rate of dissolution when applied to the soil.

A further object of the present invention is to provide a process for the economical treatment of solid fertilizer pellets of reduced particle size, such as granules, prills, and mixtures thereof and other types of sized particles, to make them water resistant, to reduce caking tendencies, to reduce or eliminate hygroscopicity, to retard the degrading action of soil microorganisms, and to produce a fertilizer product having a controlled rate of dissolution when applied to the soil wherein the treating agent is utilized in the dual role of supplying secondary plant nutrients to the soil and acting as the pellet coating.

A further object of the present invention is to provide a means for evenly distributing micronutrient compounds without segregation.

A still further object of the present invention is to provide a means of treatment of substances, as aforesaid, by agents and methods which make no perceptible change in the treated material other than in the properties stated above.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the spirit and scope of the present invention.

In carrying out the objects of our invention in one form thereof, we employ a process which comprises applying a material selected from the group comprising petrolatums, petroleum softwaxes, petroleum oils, wood rosins, paraffins, and mixtures thereof, as a subcoat to a fertilizer pellet substrate and subsequently supplying a topcoat of elemental sulfur by dipping the pellets or by spraying the pellets in a state of vigorous random motion with molten sulfur or sulfur dissolved in a solvent so that upon solidification of this sulfur, a mobile film of sealant under an insoluble shell of sulfur is formed on the surface of each pellet rendering the pellet much less susceptible to dissolution in the soil solution. To promote a still more nearly impervious coating, a third, or top, coating of the sealant material may be applied over the layer of elemental sulfur. As previously mentioned this topcoating of sealant is oftentimes sufficient, the subcoating of sealant, in such cases, being omitted.

To further promote a more nearly impervious coating, an additional light coating, 0.1 to 10 percent by weight and preferably 0.1 to 4 percent of the product, of an M–T agent such as pentachlorophenol, sodium pentachlorophenate, potassium azide, borax, and cupric chloride may be added to greatly reduce deleterious microbial action on the composite coating. if soluble in the sealant, the M–T agent may alternatively be mixed with the sealant prior to its application to the sulfur coating.

Our invention, together with further objects and advantages thereof, will be better understood from a consideration of the following description taken in connection with the accompanying drawing, which is a flowsheet generally illustrating the principles of our process which results in solid fertilizer pellets having the novel properties mentioned above.

Referring now more particularly to the flowsheet, fertilizer pellets from a source not shown are fed by means of line 1 into rotary drum 2. Line 1 may comprise a conveyor belt or similar delivery means. Molten sulfur from a source not shown is fed through line 3 by means of pump 4 into rotary drum 2. Atomizing air from a source not shown is fed through line 5, through heating means 6 and joins line 3 at junction 7. The molten sulfur and atomizing air junction at 7 and are fed by means of line 8 into rotary drum 2 by means of spray heads 9. Impregnating sealant material in a liquid state from a source not shown is fed through heated line 10 by means of pump 11, and is delivered into rotary drum 2 by means of spray heads 13. The product having desired controlled rate of dissolution leaves rotary drum 2 by means of line 14.

In the instance wherein both the molten sulfur and the sulfur solution coatings are to be applied in succession, they may be applied in the second and third compartments, respectively, of triple-compartment drum 2. Rearrangement of the spray systems in the double-compartment drum would, of course, be necessary to permit addition of the molten sulfur before the sulfur solution. If a sulfur solution is used for coating, the atomizing air is not heated and is used only with low vapor pressure solvents. The addition of a third, or top, coating of the sealant could be accomplished in the third compartment of drum 2. In the preferred embodiment of the instant invention, the M–T agent from a source not shown is fed via line 15 to dusting compartment 16, which dusting compartment could, for example, be another smaller rotary drum. The particulate M–T agent may be dusted onto the surface of the topcoating sealant material in dusting compartment 16 and withdrawn as product via line 17. Alternatively, the M–T agent could be dusted onto the sulfur-coated sealant topcoated fertilizer pellets near the discharge end of the third compartment of drum 2. In another embodiment of our invention wherein the M–T agent to be used is soluble in the impregnating oil, it optionally may be added from a source not shown directly to the impregnating oil stream, for instance, via line 18.

The method of application of the sealant coating material is not critical, although maximum penetration into the voids of the pellets is desirable. A simple method of application is that of spraying the liquefied sealant onto a rolling bed of pellets in a rotary drum. Dipping or soaking may be used as well. The oil or petrolatum, for example, may be heated to improve penetration into the substrate voids. In contrast to the method of application, the type of sealant may be very important. Some heavy oils or waxes that solidify rather easily because of oxidation or freezing will not protect the substrate; boiled linseed oil and paraffin wax alone are examples. On the other hand, some waxy or resinous semisolid materials have been found to be quite effective. Both crude and refined petrolatums and certain grades of petroleum softwaxes are examples. In general, sealants that are effective remain somewhat fluid and mobile so that the microscopic openings in a normal sulfur coating are naturally filled with the sealant by capillary action, thus preventing moisture penetration. The sealant coating material must not be miscible with water. Preferably, it should have a high coefficient of viscosity so that it will penetrate to the void spaces in the pellets when hot but will become viscous at ambient temperatures. No reaction between the oil and sulfur should occur.

In the second step of the process, a uniform coating of elemental sulfur is applied to each pellet. Spraying molten sulfur onto a rolling bed of pellets in a rotary drum is the simplest and most satisfactory coating procedure. An air-atomizing spray is required to form sulfur droplets of sufficiently small size. A simple one-quart paint sprayer was used in the laboratory tests. Other methods of spraycoat application are spraying onto a falling curtain of pellets or into a fluidized bed of pellets. Any known method of providing randomized motion of the pellets with respect to each other during the spray-coating operation may be used.

Variables that have significant effects upon the sulfur-coating efficiency are molten sulfur temperature, temperature of atomizing air to the spray head, pellet temperature, pressure of air at sprayer, coarseness of sulfur spray, and distance of spray nozzle from moving bed of pellets. The temperature and coarseness of the sulfur spray at the time of contacting the particles appear to be the most important factors. The use of 2 to 10 percent by weight of one of the previously mentioned plasticizers or finely powdered inert solids or of 1 to 30 percent of one or more of the finely divided micronutrient compounds in the sulfur significantly improves the coatings, as compared with unplasticized sulfur, by improving the spreading and fusing of the individual droplets of sulfur and by reducing the degree of crack formation in the sulfur shell.

The application of the sulfur topcoat to each pellet also may be accomplished by spraying solutions of sulfur in volatile solvents such as liquid ammonia and carbon disulfide onto a moving bed of pellets previously lightly coated with a sealant in much the same manner as with the molten sulfur spray method. Sulfur solution concentrations of up to 30 percent sulfur may be used, although concentrations in the range of 5 to 15 percent result in more uniform coatings. In cases where heavily sealant-impregnated substrates are used, it may be desirable to improve the adherence of the sulfur coating by combining the molten sulfur spray and the sulfur solution spray methods. A light molten sulfur coating would be applied first in these cases. The solution spray method is more complicated but results in more effective coatings than the molten spray method.

The presence of the sealant-impregnated subcoating does not avoid the necessity for applying as nearly a uniform sulfur coating as possible. If the entire surface of the substrate is not covered completely with sulfur, the substrate will dissolve in water within a few minutes. It appears that the advantage given by the sealant subcoating is the sealing of the microscopic cracks and pores which form in the sulfur shell in spite of normal care in application. This permits the use of thinner, but necessarily uniform, coatings than is otherwise possible. Relatively large pores or thin spots due to nonuniform application are not sealed by the sealant.

In the process wherein the elemental sulfur is applied in the molten state, the sulfur, of course, prior to coating must be converted to a liquid form. This may be done by heating above its melting point (113° C.), preferably in the range of 120° to 155° C. to obtain optimum viscosity. The molten sulfur may be further treated by the addition of small amounts (1 to 10 percent) of ethylene polysulfides, thiodipropionic acid polyester, or phosphorus polysulfides in order to increase the plasticity and/or flowability of the molten sulfur. These additives alter the equilibrium crystalline structure of the sulfur upon solidification, rendering it less permeable to moisture and increasing the continuity of the sulfur coating deposited. Iodine (or other halogens) may likewise be added to the molten sulfur to decrease its viscosity; this is helpful in spreading the liquid sulfur over the granule surface in the very short time before it solidifies. Certain synthetic plastics such as polyethylene and polyvinyl acetate are compatible with molten sulfur and may be promising sealants for a normal crystalline coating. The addition of finely powdered inert solids, such as talc, vermiculite, or micronutrient compounds also aid in the uniform application of the sulfur and reduce its tendency to crack on cooling. The finely divided micronutrient compounds accomplish the same purpose and serve as micronutrient sources as well. These powdered solids are simply added in the desired quantity up to about 30 percent by weight to the molten sulfur prior to its application to the pellets. Only mild agitation is required to keep the solid micronutrient material in suspension.

In order that those skilled in the art may better understand how the present invention can be practiced, the following examples of processes which we have used in the steps of producing hygroscopic fertilizer pellets having a nearly impervious shell or coating, thereby ensuring a fertilizer product having a controlled rate of dissolution in the soil solution, are given by way of illustration and not by way of limitation.

*Example I*

Minus 8- plus 14-mesh urea prills were impregnated with SAE 30 motor oil by applying a vacuum to a suspension of the prills in oil. Excess oil was drained from the particles, leaving an oil residue of about 3 percent by weight. The oiled urea was coated with sulfur by means of a molten spray. The sulfur contained 5 percent plasticizer (ZM-421—from Thickol Chemical Corporation). Various proportions of coating were applied. The atomizing air to the sprayer was at about 500° F. and 25 p.s.i.g. pressure. The tumbling bed of pellets was at 130° F. and the spray nozzle was 3 inches from the bed. The molten sulfur was at 177° C. For comparison, urea prills were also coated with oil only or with sulfur only (under same conditions as above). Similar tests in which large (−½ +⅜ in.) granules of ammonium phosphate nitrate were coated under the same conditions were also made. Again, oil or sulfur coatings alone were applied for comparison. The effectiveness of the coatings was determined by submerging the coated pellets in water and determining the proportion of the soluble salt dissolved after various lengths of time.

The oil treatment alone was entirely ineffective in all tests. The sulfur coatings alone reduced the rate of dissolution only slightly. The combining of the oil and the sulfur coatings had a synergistic effect in that the combination gave far better results (lower dissolution losses) than did either coating when used alone. In two tests (35 percent sulfur coating on urea prills and 20 percent sulfur on the large granules), the dissolution losses were reduced to 30 percent and 0 percent, respectively, in 5 days of immersion.

*Example II*

Additional tests were carried out as in Example I above and the results of these tests and the operating conditions under which they were carried out are given in Table I.

TABLE I.—RATES OF DISSOLUTION IN WATER OF FERTILIZER PELLETS COATED WITH PETROLEUM OIL, WITH SULFUR,[1] OR WITH THE COMBINATION OF AN OIL SUBCOAT AND A SULFUR TOPCOAT

| Fertilizer | | Weight percent of applied coating (total weight basis) | | | | Percent dissolution of fertilizer substrate in standard immersion test [2] | | | |
| --- | --- | --- | --- | --- | --- | --- | --- | --- | --- |
| | | | | Combination coating | | Oil treated | Sulfur coated | Combination coating | |
| Material | Particle size | Oil treated | Sulfur coated | Oil | Sulfur | 24 hr. | 24 hr. | 24 hr. | 5 da. |
| Urea prills | −8 +14 mesh | 3 | 25 | 3 | 25 | 100 | 70 | 15 | |
| | | 2 | 35 | 2 | 35 | 100 | 55 | 7 | 30 |
| Granules [3] | −½ +⅜″ | 6 | 20 | 6 | 20 | 100 | 20 | 0 | 0 |
| | | 3 | 21 | 3 | 21 | 100 | 19 | 1 | |

[1] The sulfur contained 5% plasticizer, Thiokol ZM-421.
[2] Coated pellets immersed in water at room temperature for indicated time period; weight ratio of pellets to water, 1:5. Loss of substrate determined by drying at 150° F. and weighing.
[3] Ammonium phosphate nitrate (30-10-0).

Example III

Still other tests were carried out as in Example I and the results of these tests and the operating conditions under which they were carried out are given in Table II.

was 14 percent of product weight. The micronutrient element concentrations (wt. percent) in the product were: 0.12 B, 0.08 Cu, 0.16 Zn, 0.42 Mn, 0.16 Fe, and 0.05 Mo; the sulfur concentration was 9.8 percent by weight. The TABLE II.—EFFECT OF THE SEQUENCE OF ADDITION OF PETROLEUM OIL RELATIVE TO THE ADDITION OF SULFUR COATINGS ON FERTILIZER PELLETS UPON THE DISSOLUTION OF THE SUBSTRATE IN WATER

| Variables | −8 +14 M Urea Prills | | | −4 +6 M 30–10–0 Granules | | |
|---|---|---|---|---|---|---|
| | Undercoat | Top Coat | Undercoat and Topcoat | Undercoat | Topcoat | Undercoat and Topcoat |
| Sulfur Coating,[1] Wt. percent | 22.2 | 22.6 | 22.2 | 20.4 | 20.6 | 20.6 |
| Oil Coating,[2] Wt. percent: | | | | | | |
|   Undercoat | 4.4 | None | 3.3 | 3.8 | None | 4.5 |
|   Topcoat | None | 3.1 | 2.5 | None | 3.1 | 2.3 |
| Substrate Dissolution,[3] Wt. percent | 42 | 53 | 11 | 31 | 7 | 27 |

[1] Sulfur applied as molten spray; contained 5% by weight of ZM-399 Thiokol plasticizer.
[2] SAE 30 oil; applied either before (as undercoat) the sulfur coating, after (as topcoating) the sulfur coating, or both before and after (as combination) the sulfur coating.
[3] Standard test, as described in footnote (b), Table I; time period, 24 hours.

Example IV

Minus 8- plus 14-mesh urea prills and −4 +6-mesh ammonium phosphate-nitrate granules were coated with sulfur by spraying a uniform suspension of finely ground (100 percent minus 200 mesh) vermiculite or talc in the molten sulfur under essentially the conditions described in Example I. A final topcoating of petroleum oil was added in all tests. The results of these tests and the conditions under which they were made are given in Table III. Tests (Nos. 3 and 6) in which only plasticizer was added to the molten sulfur are given for comparison.

coating, not intended to greatly retard the substrate dissolution rate, served as an excellent anticaking medium as well as a source of the micronutrients.

Example VI

Twelve parts of a finely divided (−100 mesh) mixture of ZnO, CuO, MnO$_2$, Fe$_2$O$_3$, MoO$_3$, and H$_2$B$_4$O$_7$ were suspended in 88 parts of molten elemental sulfur maintained at 280° to 300° F. The amounts of each of the compounds were so regulated as to yield the following product analysis when the sulfur micronutrient coating amounted to 20 percent by weight; 0.2 percent of each of boron, cop- TABLE III.—EFFECTS UPON WATER DISSOLUTION OF THE ADDITION OF FINELY POWDERED INERT SOLIDS TO THE MOLTEN SULFUR PRIOR TO THE APPLICATION OF SULFUR COATINGS AND OIL TOPCOATING [1] TO FERTILIZER PELLETS

| Test No. | Fertilizer | | Sulfur Coating,[2] Wt. Percent | Additive | Additive Particle Size | Additive, Wt. Percent [3] | Dissolution of substrate in 24 hrs., Wt. Percent |
|---|---|---|---|---|---|---|---|
| | Material | Particle Size | | | | | |
| 1 | Urea Prills | −8 +14 M | 25 | Talc | −300 M | 5 | 5 |
| 2 | do | −8 +14 M | 20 | Vermiculite | −350 M | 2 | 2 |
| 3 | do | −8 +14 M | 20 | ZM-421 [4] | | 5 | 7 |
| 4 | Granules [5] | −4 +6 M | 15 | Talc | −300 M | 5 | 6 |
| 5 | do | −4 +6 M | 11 | Vermiculite | −350 M | 2 | 1 |
| 6 | do | −4 +6 M | 15 | ZM-421 [4] | | 5 | 4 |

[1] Prills had 6% SAE 30 oil topcoatings; granules had 4% SAE 30 oil topcoats.
[2] Including additive.
[3] Amount of additive in sulfur by weight percent.
[4] Tests with homogeneous sulfur-plasticizer (Thiokol organic polysulfide) coatings.
[5] TVA 30–10–0.

It is noted that both solid, inert additives were essentially equal in effectiveness to the organic polysulfide plasticizer in yielding low dissolution rates for these oil topcoated products. The vermiculite was generally more effective than either the talc or the plasticizer.

Example V

Thirty parts of a pulverized commercial micronutrient frit (FTE 501—2.8 percent B, 2.0 percent Cu, 4.0 percent Zn, 9.7 percent Mn, 3.9 percent Fe, and 0.13 percent Mo) were suspended in 70 parts of molten elemental sulfur maintained at 250° F. The frit was sized to minus 20 mesh. Vigorous agitation of the suspension was provided to prevent settling. The suspension was sprayed through a commercial constant-bleed paint gun nozzle, using heated atomizing air (300° F.), onto a rolling bed of minus 4- plus 6-mesh 30–10–0 ammonium phosphate nitrate granules in a small rotary drum. The liquid suspension solidified into a uniform coating on each granule. The coating per, zinc, and manganese; 0.45 percent of iron; and 0.01 percent of molybdenum. Mild agitation (periodic shaking) of the suspension was needed to prevent settling of the suspension. The suspension was applied to minus 4- plus 6-mesh ammonium phosphate nitrate granules in the manner described in Example I; the weight percent of this coating was 19 percent. An additional sealant coating of USP petrolatum was sprayed onto the sulfur coating in the amount of 3 percent by weight of the product; this step was after the manner described in patent application Ser. No. 292,215, June 28, 1953, Blouin et al., assigned to the same assignee as is the present application and now abandoned. The final product contained about 0.19 percent each of B, Cu, Zn, and Mn, 0.40 percent Fe, and 0.009 percent Mo. When a 2-gram sample was submerged in 10 milliliters of water for 24 hours at room temperature, only 9 percent of the soluble substrate was solubilized. Without such a coating, 100 percent of the substrate dissolved in less than 2 hours.

Example VII

Minus 4- plus 6-mesh ammonium phosphate nitrate granules were coated with various combinations of petroleum oil (SAE 30) and sulfur, or of PRP (1 part petrolatum, 3 parts wood rosin, and 1 part paraffin, by weight) and sulfur to compare the effectiveness of the PRP mixture with petroleum oil as the secondary coating medium. The sulfur was applied under the general conditions as described in Example I. The conditions under which the tests were made and their results are given in Table IV below.

TABLE IV.—COMPARISON OF EFFECTS OF PETROLEUM OIL SECONDARY COATINGS UPON SUBSTRATE DISSOLUTION IN WATER WITH THOSE OF PRP WHEN APPLIED TO SULFUR COATED AMMONIUM PHOSPHATE NITRATE GRANULES (−4 +6 MESH)

| Test No. | Weight Percent of Coatings | | | Total Coating | Dissolution of Substrate in Water in 24 hrs., Wt. Percent |
|---|---|---|---|---|---|
| | Undercoating | Sulfur | Topcoating | | |
| Petroleum Oil Coatings: | | | | | |
| 1 | 1 | 21 | 4 | 26 | 16 |
| 2 | None | 16 | 3 | 19 | 6 |
| PRP Coatings: | | | | | |
| 3 | 2 | 15 | None | 17 | 29 |
| 4 | 2 | 15 | 1 | 18 | 7 |
| 5 | None | 16 | 5 | 21 | 16 |

The data indicate that the PRP was about as effective as the petroleum oil (Test 2 v. Test 4) but that the combination of undercoating and topcoating was required for the PRP. The product from Test 4, after aging for 3 months, was considerably more effective (dissolution rate, 0.2 percent in 24 hours) than when first applied.

Example VIII

Minus 8- plus 14-mesh urea prills were coated with elemental sulfur by means of a molten spray. The molten sulfur was maintained at about 155° C. in the spray can. The atomizing air was held at 15 p.s.i.g. and 165° C. The urea prills were tumbled in a 6-inch diameter horizontal rotating drum at 60 r.p.m.; the average temperature of the prills during the coating process was 65° C. The spray nozzle was held 3 inches from the tumbling bed. Molten sulfur was sprayed on the bed until the sulfur content of the coated product was 27.9 percent by weight. Following this, USP petrolatum was melted at about 55° C. and sprinkled over the warm sulfur-coated prills. The sealant spread rapidly and evenly in about 5 minutes of tumbling. The sealant content of the product was 3 percent by weight. The coating was tested by submerging a sample of the coated product in water at 27° C. and 38° C. for 24 hours. After this time, drying the product revealed that only 2 percent by weight of prills was dissolved at 27° C. and 7 percent at 38° C.

Example IX

A coating of elemental sulfur and a topcoating of sealant were added to minus 6- plus 12-mesh urea granules in much the same manner and in the same equipment as that described in Example I. The molten sulfur was held at an average temperature of 142° C., the atomizing air at 155° C., and the tumbling bed of granules at about 67° C. The sulfur content of the granules was 20.1 percent by weight. Following this, a petroleum softwax containing 25 percent oil and melting at 76° C. was sprinkled over the warm, tumbling sulfur-coated granules in an amount such that the sealant content of the product was 4 percent by weight. The sealant spread rapidly and completely. In the water-immersion test at 38° C. for 24 hours, only 2 percent of the urea granules was dissolved.

Example X

A coating of elemental sulfur and a topcoating of sealant were applied to minus 6- plus 10-mesh urea granules in a manner and in equipment similar to that described in Examples I through IX. The sulfur content of the coated granules was 17.1 percent by weight and the sealant content was 4.0 percent by weight. The batch was divided into 4 equal portions; 1 portion received no further treatment, 1 received powdered pentachlorophenol dusted onto the sealant surface in the amount of 4 percent by weight of the coated product, the third portion received powdered sodium pentachlorophenate dusted onto the sealant surface in the amount of 4 percent by weight of the coated product, the third portion received powdered sodium pentachlorophenate dusted onto the sealant surface in the amount of 2 percent by weight of the coated product, and the fourth received powdered cupric chloride dusted on the sealant surface in the amount of 2 percent by weight of the product. One-gram samples of each of the three portions above were buried about 1 inch deep in Davidson soil (pH 5.3) maintained at about 80° F. but open to ambient (room) humidity conditions, thus permitting normal moisture evaporation. The Davidson soil is commonly described as a reddish-brown lateritic soil derived from chloritic greenstone found in the Piedmont area of the southeastern portion of the United States. The amount of water evaporating was replaced daily, bringing the soil moisture content back to its original level (23 percent by weight). At the end of 21 days of exposure to the soil, the samples of coated products were recovered from the soil, quickly washed and then dried at 150° F. to constant weight. The loss of weight was equivalent to the dissolution of the substrate in the soil solution. The following tabulation of data shows the effects of the M–T agents in reducing substrate dissolution.

M–T agent:      Substrate dissolution losses in soil solution in 21 days, wt. percent
- None (control sample) — 51.1
- Boric acid (4%) — 34.8
- Borax (4%) — 20.1
- Pentachlorophenol (4%) — 10.1
- Sodium pentachlorophenate (2%) — 5.1
- Ethylene polysulfide (4%) — 22.6
- Cupric chloride (2%) — 18.7

The above data indicate that the presence of the M–T agents greatly reduced microbial action on the coating, thereby increasing the effectiveness of the composite coating by as much as 1000 percent of the effectiveness of the coating without the protection of an M–T agent.

Example XI

A coating of elemental sulfur and a topcoating of sealant were applied to minus 6- plus 10-mesh urea granules again in a manner and in equipment similar to that described in Examples I through IX. The sulfur content was 17.4 percent by weight and the sealant content was 5 percent by weight. The batch was divided into 3 equal parts and 1 part received one-half percent by weight of the product of powdered pentachlorophenol, another part received 1 percent by weight of the same M-T agent, and the third received no further treatment. The M-T agents were added in the manner described in Example X. The two samples were exposed to the same Davidson soil as described in Example X except that in this case the soil moisture content was increased to 25 percent by weight to determine if the higher soil moisture would offset the effects of the M-T agent. Recovery and determinations of losses in product weights were accomplished as in Example X. The substrate dissolution data obtained are given in the following tabulation:

M-T agent: Substrate dissolution losses in soil solution in 21 days, wt. percent
- None (control sample) _____ 15.0
- ½% pentachlorophenol _____ 6.2
- 1% pentachlorophenol _____ 1.0

The data show that while the increased soil moisture content decreased the dissolution loss from the untreated product (15 percent versus 51 percent in Example X), the M-T agent was nevertheless effective in reducing the dissolution losses still further to about 7 to 40 percent of that of the unprotected sample.

*Example XII*

In order to more positively identify the action of the M-T agents in reducing microbial activity on the coatings as illustrated in Example X and XI, 2 identical samples were tested by burying one in unsterilized Davidson soil and one in Davidson soil which had been sterilized by the conventional laboratory method of steaming (15 p.s.i.g., 250° F., 30 minutes). Subsequently the dissolution tests were conducted at 80° F. with a maximum soil moisture content of about 25 percent. The data are given in the following tabulation:

Soil treatment: Substrate dissolution losses in soil moisture in 21 days, wt. percent
- None _____ 13.4
- Steam sterilized _____ 4.5

The data substantiate the effects of the M-T agents by showing that sterilization of the soil—killing the soil microorganisms—greatly reduces degradation of the coating and thereby greatly increases the effectiveness of the coating. The sample in the unsterilized soil above lost nearly the same amount of substrate as did the untreated coated sample in Example XI; similarly the sample in the steam-sterilized soil lost about the same amount of substrate as did the coated sample containing ½ percent of chloropentaphenol. More importantly, both sterilization procedures resulted in about a 60 percent reduction in dissolution rate of the soluble substrate.

*Example XIII*

A coating of elemental sulfur and a topcoating of sealant were applied to minus 6- plus 10-mesh urea granules as described in previous Exampes I through IX. The sulfur content was 17.4 percent by weight and the sealant content was 5 percent by weight. The batch was divided into a number of equal parts. One part was set aside as the check sample and the other parts received treatments of M-T agents as described in Example X with exceptions listed in the tabulation below. The amounts of M-T agents used are given in the tabulation below. All samples were then buried in the same Davidson soil and under the conditions described in Example X, except that the maximum moisture level of the soil was periodically adjusted to 25 percent by weight. Some samples were left in the soil 21 days, others for 49 days. The data obtained are given in the following tabulation:

| M-T Agent | | Substrate Dissolution Losses in Soil Solution at 80° F. in No. of Days Indicated | |
|---|---|---|---|
| Material | Amount, wt. percent of product | 21 days | 49 days |
| None (control sample) | | 17 | 59 |
| Calcium cyanamide | 5 | 11 | 16 |
| Coal tar oil [1] | 5 | 10 | 14 |
| Sodium azide | 2 | 11 | |
| Potassium azide | 2 | 8 | |
| Cresol | 4 | 6 | |
| Camphor [2] | 0.25 | 0 | |
| Streptomycin | 1 | 12 | |

[1] Added as mixture of 1 part coal tar oil plus 1 part of powdered vermiculite.
[2] Added as 1 part camphor dissolved in 19 parts sealant.

The data indicate that the M-T agents not only remain effective over the longer period of time (49 days), but also give greater relative protection over the longer period. The camphor was particularly effective when incorporated with the sealant prior to its application to the base sulfur coating.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. In an improved process of manufacturing fertilizer adapted for use in promoting survival and health in crop plants and containing specifically proportioned amounts of plant nutrients encased in a nearly impervious shell, whereby the dissolution rate of said plant nutrients in soil solution is controlled, thereby insuring the availability of plant nutrients to the crop plants during a substantial proportion of the growing season, the instant improvement relating to further enhancement of the degradation characteristics of said nearly impervious shell, which process comprises applying a coating of elemental sulfur to fertilizer pellets in quantity such that said sulfur contributes in the range from about 5 percent to about 50 percent by weight of the total coated fertilizer pellet; subsequently topcoating the resulting coated pellet with a sealant material characterized by its oily nature, said material selected from the group consisting of petrolatums, petroleum softwaxes, petroleum oils, wood rosins, paraffins, and mixtures thereof, in quantities such that said oily material contributes in the range from about 1 percent to about 8 percent by weight of the total weight of the coated fertilizer pellet, and said quantity of oily material sufficient only to impregnate any cracks and voids in said sulfur coating; the improvement in combination therewith for further enhancement of the sealant characteristics of the nearly impervious shell, particularly those characteristics related to the microbiological degradation of the composite coating, which improved process comprises the additional step of adding to the topcoating of sealant material in the range from about 0.1 percent to about 10 percent by weight of the total sealed and coated fertilizer pellet a microbially-toxic agent selected from the group consisting of pentachlorophenol, sodium pentachlorophenate, coal tar oil, cresol, cupric chloride, borax, boric acid, sodium azide, potassium azide, ethylene polysulfide, streptomycin, calcium cyanamide, camphor, and mixtures thereof, and said improved process characterized by the fact that the addition of the microbially-toxic agent to the sealant material substantially reduces the deleterious microbiological activity on the composite coating when the coated and sealed fertilizer pellet is subsequently exposed to its intended environment in a soil solution.

2. The process of claim 1 wherein the amount of microbially-toxic agent added to the sealed and coated fertilizer pellet is in the range from about 0.1 to about 4 percent by weight of the total pellet.

3. The process of claim 2 wherein the microbially-toxic agent is selected from the group consisting of pentachlorophenol, coal tar oil, camphor, cresol, and mixtures thereof, and which group is dissolved in the sealant material characterized by its oily nature, and which agent, due to its solubility in said sealant material, is added to the fertilizer pellet by means of dissolving same in the sealant material prior to topcoating the sulfur-coated pellet with said sealant material.

4. The process of claim 1 wherein a subcoating of the material characterized by its oily nature is first added in quantities relative to the weight of said fertilizer pellet in the range from about 1 percent to about 8 percent by weight prior to the sulfur coating step for said fertilizer pellet.

References Cited

UNITED STATES PATENTS

| | | | |
|---|---|---|---|
| 1,609,070 | 11/1926 | Dye | 71—3 |
| 3,295,950 | 1/1967 | Blouin et al. | 71—64 |

FOREIGN PATENTS 589,926  12/1959  Canada.

DONALL H. SYLVESTER, *Primary Examiner.*

T. D. KILEY, *Assistant Examiner.*